(12) United States Patent   (10) Patent No.: US 7,889,201 B2
Yato                        (45) Date of Patent: Feb. 15, 2011

(54) INFORMATION PROCESSING APPARATUS

(75) Inventor: Shinsuke Yato, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 53 days.

(21) Appl. No.: 12/249,761

(22) Filed: Oct. 10, 2008

(65) Prior Publication Data

US 2009/0160868 A1    Jun. 25, 2009

(30) Foreign Application Priority Data

Dec. 21, 2007    (JP) .............. 2007-331054

(51) Int. Cl.
  *G06F 15/00*    (2006.01)
  *G06F 3/00*    (2006.01)
  *G06F 1/26*    (2006.01)
(52) U.S. Cl. .................. 345/501; 710/5; 713/320
(58) Field of Classification Search ........... 345/501; 710/5; 713/300, 320; 348/725, 730
  See application file for complete search history.

(56) References Cited

U.S. PATENT DOCUMENTS 6,373,904 B1     4/2002 Sakamoto et al.
2006/0280055 A1* 12/2006 Miller et al. .............. 369/44.11
2008/0244097 A1* 10/2008 Candelore et al. .............. 710/5

FOREIGN PATENT DOCUMENTS

JP    H9-284439 A    10/1997
JP    2003-108273    4/2003
JP    2006-201852    8/2006
JP    2007-288247    11/2007

OTHER PUBLICATIONS

Office Action for Japanese Patent Application No. 2007-331054, mailed Jan. 13, 2009.
Notification of Reasons for Rejection issued by JPO in the corresponding to the Japanese Patent Application No. 2007-331054 on Jan. 13, 2009.

* cited by examiner

*Primary Examiner*—Joni Hsu
(74) *Attorney, Agent, or Firm*—Knobbe, Martens, Olson & Bear LLP

(57) ABSTRACT

According to one embodiment, an information processing apparatus includes a connector, a graphics controller, a management controller, and a power supply control module. The graphics controller controls output of video signals and audio signals from the connector. The management controller inputs/outputs the various commands via the connector. The power supply control module supplies power for operation to both of the graphics controller and the management controller during a power-off state, and supplies power for operation only to the management controller in a power-on state. Both of the graphics controller and the management controller include a function of acquiring identification information of the connection destination by means of the signal line. And, the management controller deactivates the function of acquiring identification information of the connection destination by means of the signal line during a power-on state.

5 Claims, 4 Drawing Sheets

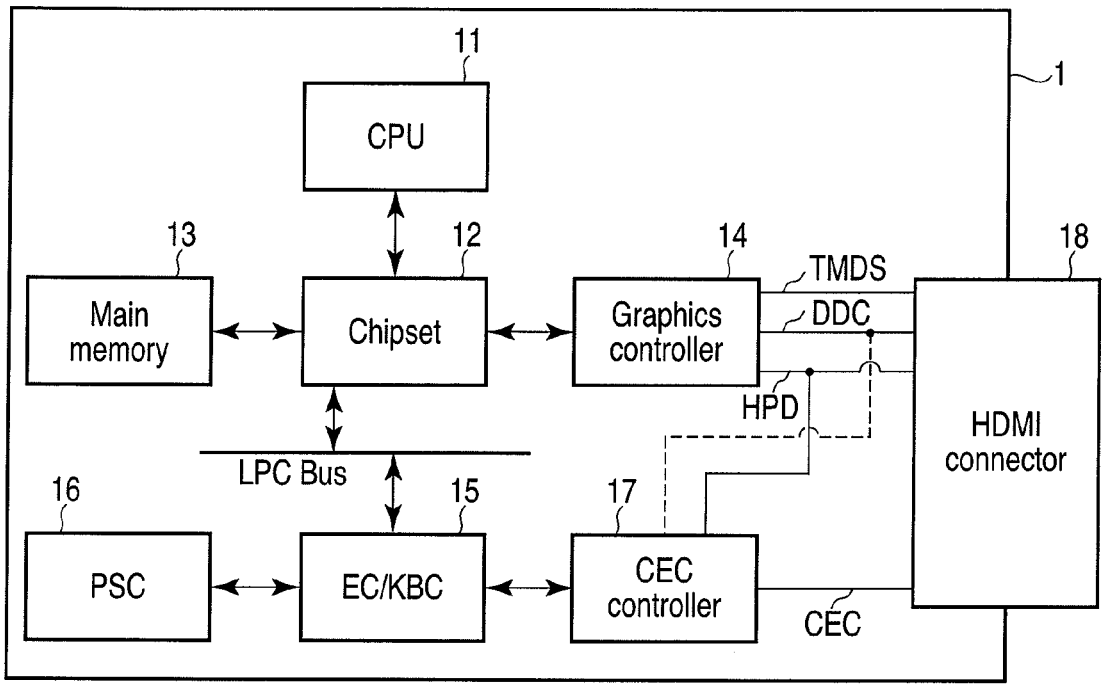
F I G. 3
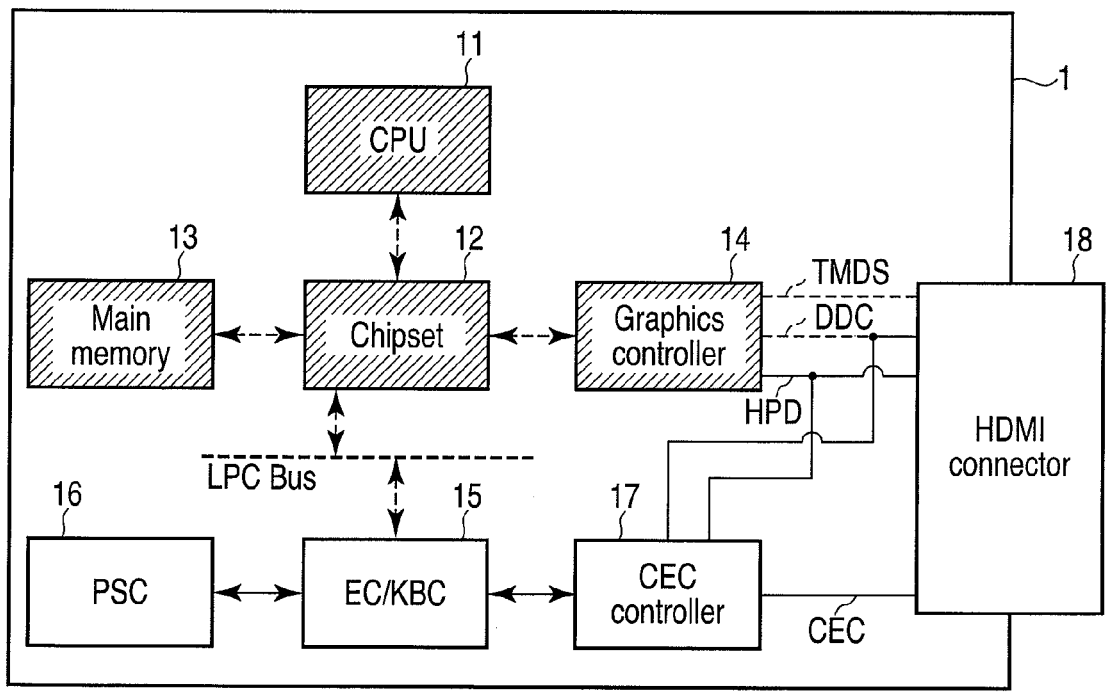
F I G. 4

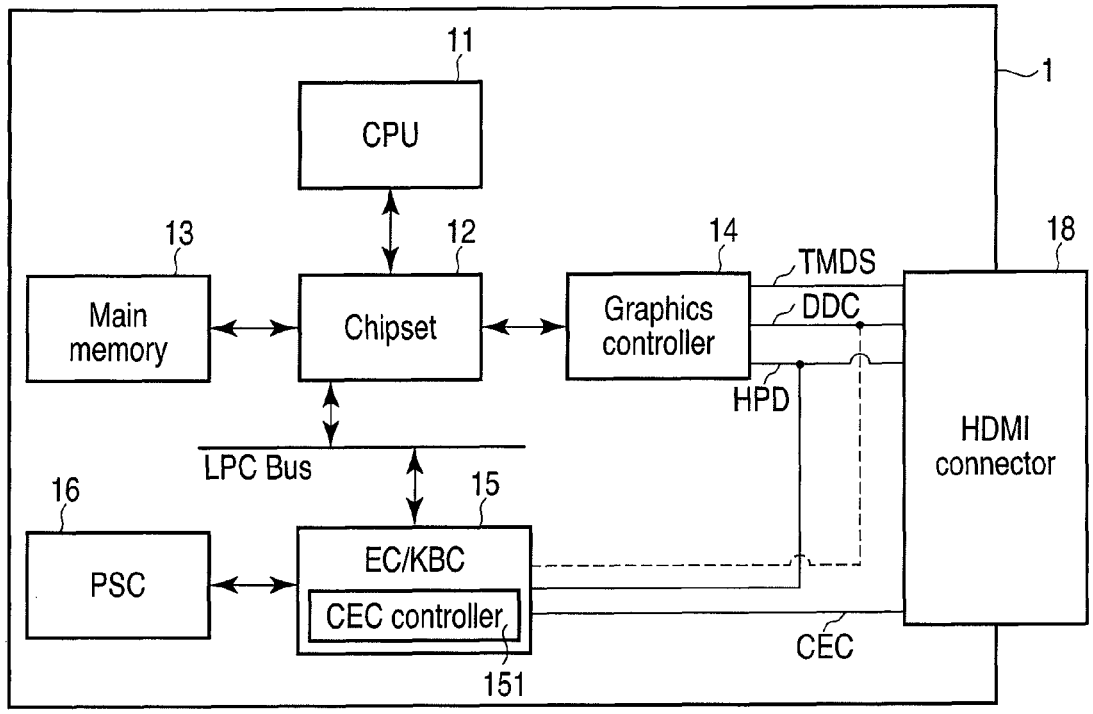
F I G. 5
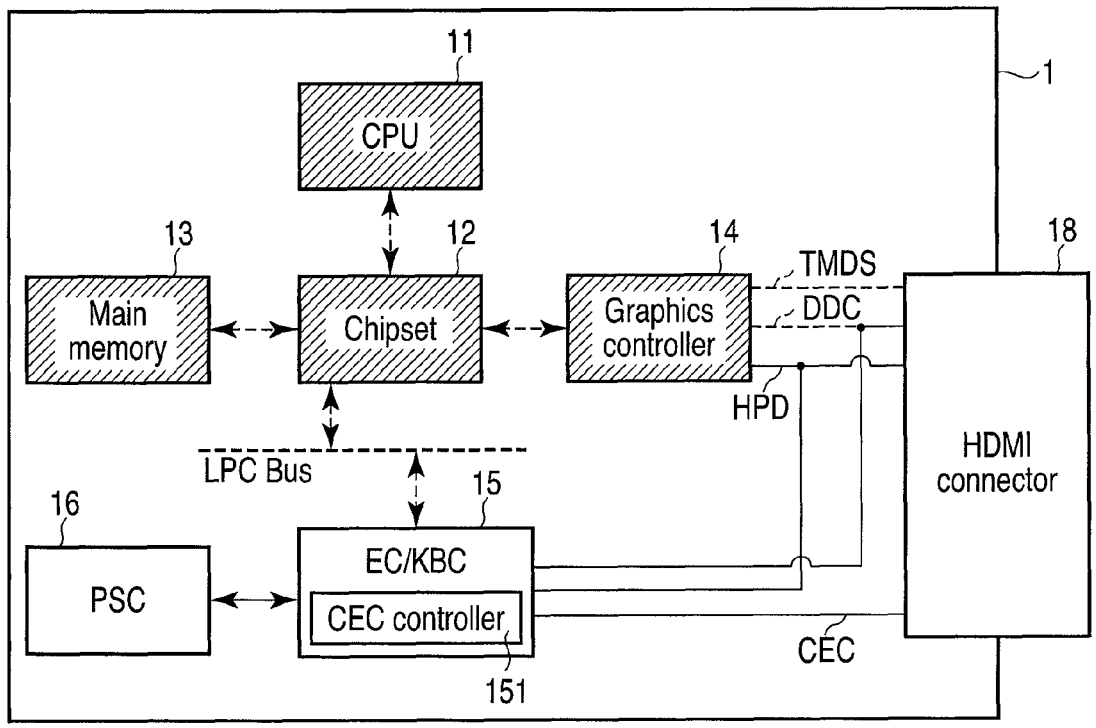
F I G. 6

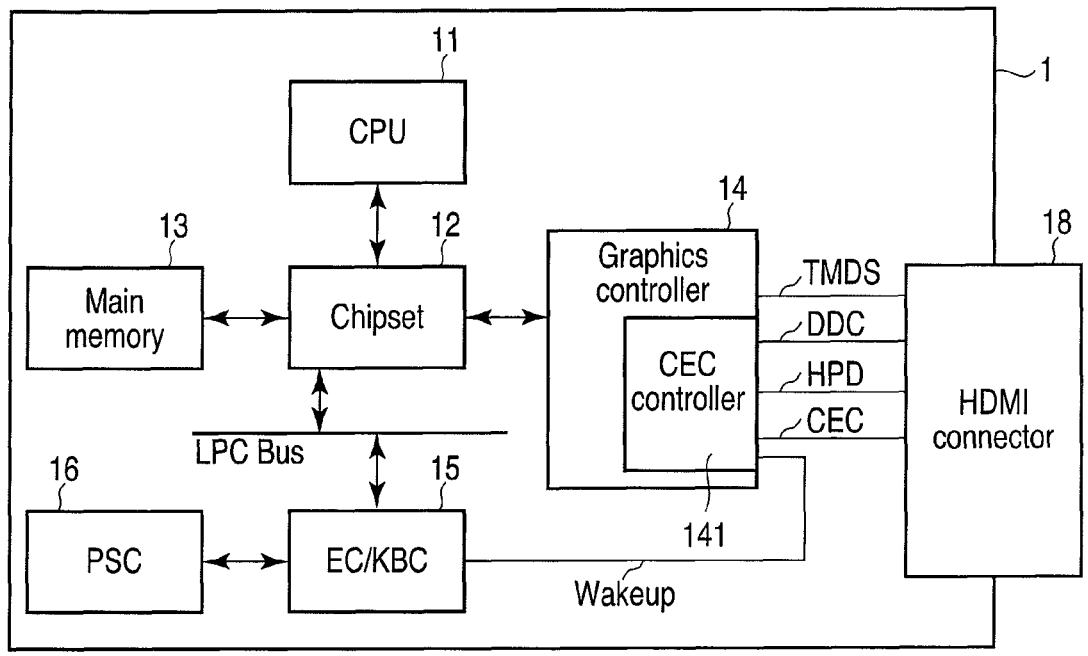
F I G. 7
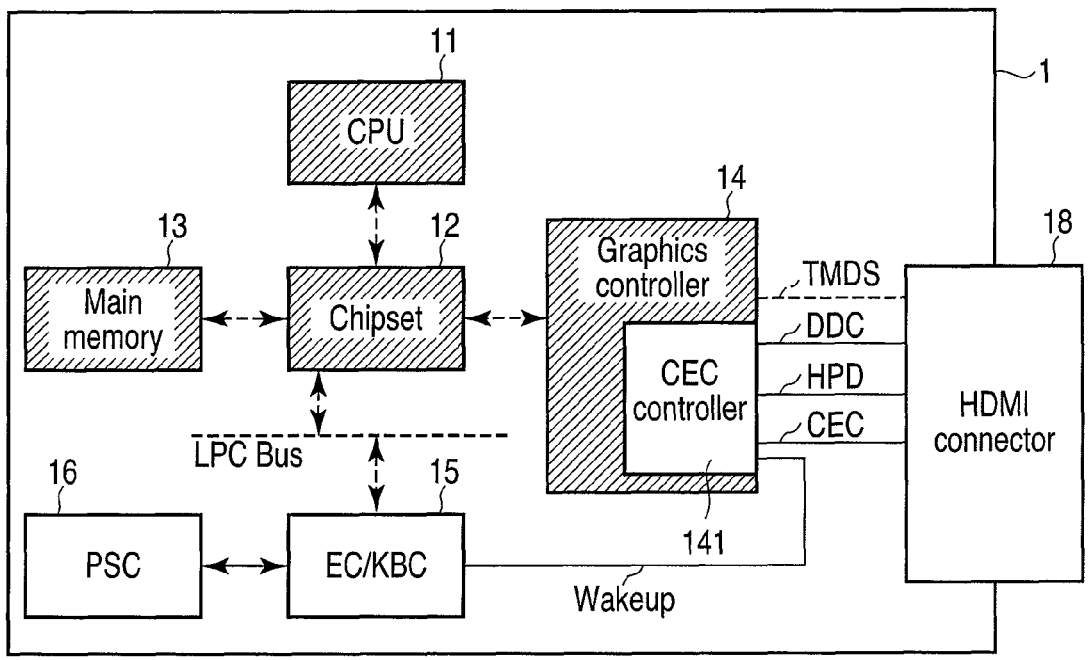
F I G. 8

INFORMATION PROCESSING APPARATUS

CROSS-REFERENCE TO RELATED APPLICATIONS

This application is based upon and claims the benefit of priority from Japanese Patent Application No. 2007-331054, filed Dec. 21, 2007, the entire contents of which are incorporated herein by reference.

BACKGROUND

1. Field

One embodiment of the invention relates to an operation control technique preferably applied to a personal computer, for example, capable of transmitting video signals and audio signals to a television receiver, for example.

2. Description of the Related Art

Recently, personal computers including the functions of viewing and recording television broadcast program data and playing back audio-visual (AV) content stored on a Digital Versatile Disc (DVD) have become widely available. Thereby, by carrying a notebook-type personal computer which can be driven by a battery, video data (including audio data) have become accessible even on the road or away from home.

Further, high-definition video content is being developed, and personal computers capable of playing back high-definition video data stored on a high-definition DVD (HD-DVD) compatible recording medium are also becoming available. Generally, this kind of personal computer is equipped with a mechanism for externally outputting high-definition video signals. By connecting such a personal computer to a large-screen high-definition television receiver, for example, high-definition video played back by the personal computer can be enjoyed on the large-screen high-definition television receiver at home.

Moreover, in a case where a plurality of electronic devices are connected to one another, such as the above-mentioned case where a personal computer and a television receiver are connected to each other, an approach for enabling an operation instruction to another electronic device by an operation to one electronic device has recently been devised. Thereby, by using only a remote controller of one of two electronic devices, the user can provide both of the electronic devices with operation instructions. Up to now, various approaches for appropriately performing operation control according to a connection destination have been proposed (see Jpn. Pat. Appln. KOKAI Publication No. 9-284439, for example).

The resources of a personal computer are collectively managed by an operating system (OS). Display of video data generated by various application programs operated under the OS on a display device is controlled by a graphics controller. The above-described external output of high-definition video signals is also controlled by the graphics controller. That is, data transmission between the personal computer and a large-screen high-definition television receiver is basically performed by the graphics controller.

In a personal computer which can be powered by battery such as a notebook computer, various power conservation approaches have been proposed to extend the battery driven time as much as possible. In general, power supply to a graphics controller is interrupted in a power-off state for the purpose of power conservation.

Therefore, there has been a problem that, when an operation instruction is attempted to be given to a personal computer, which is connected to a large-screen high-definition television receiver and is in a power-off state, to switch to a power-on state, for example, by an operation of the large-screen high-definition television receiver, a graphics controller which manages transmit of data to acquire information necessary for performing operation control based on the operation instruction cannot be activated, and the operation instruction cannot be accepted.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 3 is an exemplary diagram showing a system configuration and a power-on state of the information processing apparatus according to a first embodiment of the invention;

FIG. 4 is an exemplary diagram showing a system configuration and a power-off state of the information processing apparatus according to the first embodiment;

FIG. 5 is an exemplary diagram showing a system configuration and a power-on state of the information processing apparatus according to a second embodiment of the invention;

FIG. 6 is an exemplary diagram showing a system configuration and a power-off state of the information processing apparatus according to the second embodiment;

FIG. 7 is an exemplary diagram showing a system configuration and a power-on state of the information processing apparatus according to a third embodiment of the invention; and FIG. 8 is an exemplary diagram showing a system configuration and a power-off state of the information processing apparatus according to the third embodiment.

DETAILED DESCRIPTION

Various embodiments according to the invention will be described hereinafter with reference to the accompanying drawings. In general, according to one embodiment of the invention, an information processing apparatus includes a connector, a graphics controller, a management controller, and a power supply control module. The graphics controller controls output of video signals and audio signals from the connector. The management controller inputs/outputs the various commands via the connector. The power supply control module supplies power for operation to both of the graphics controller and the management controller during a power-on state, and supplies power for operation only to the management controller in a power-off state. Both of the graphics controller and the management controller include a function of acquiring identification information of the connection destination by means of the signal line. And, the management controller deactivates the function of acquiring identification information of the connection destination by means of the signal line during a power-on state.

Figure 1:
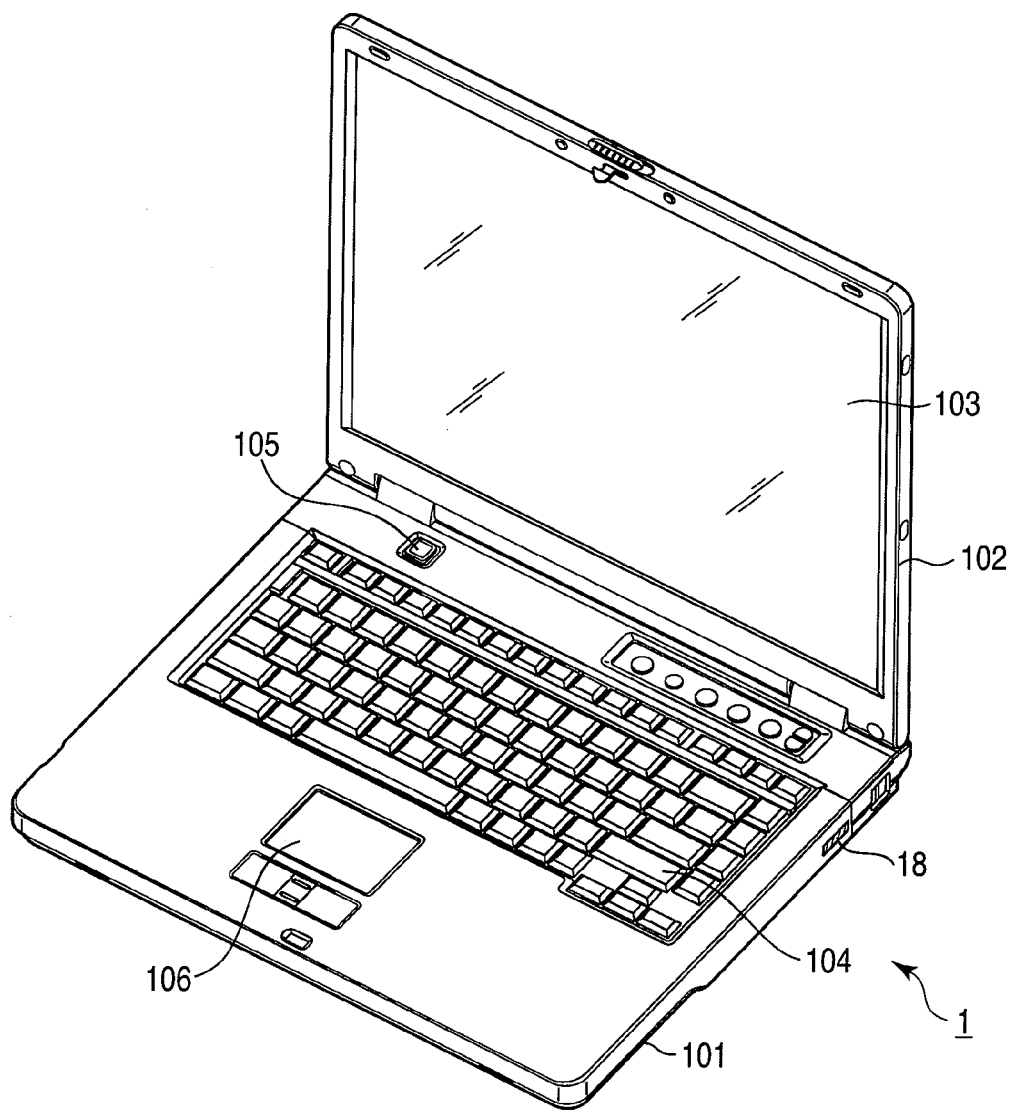
FIG. 1 is an exemplary diagram showing an outer appearance of the information processing apparatus (personal computer) according to embodiments of the present invention.

FIG. 1 is an exemplary perspective view of the notebook-type personal computer 1 in a state where a display unit is open. The computer 1 is formed of a computer body 101 and a display unit 102. The display unit 102 includes a built-in display device formed of a liquid crystal display (LCD) 103. A display screen of the LCD 103 is positioned approximately at the center of the display unit 102.

The display unit 102 is rotatably mounted between an open position and a closed position with respect to the computer body 101. The computer body 101 includes a thin box-like casing. On an upper surface of the casing, a keyboard 104, a power button 105 for turning on/off the computer 1, a touch pad 106, and so forth are arranged.

Figure 2:
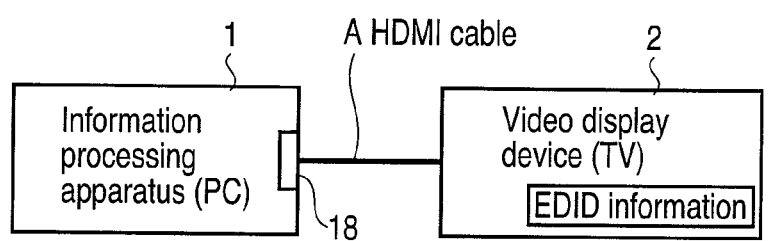
FIG. 2 is an exemplary diagram showing a utilization aspect (for use in connection with a video display device) of the information processing device according to the embodiments.

On a side surface of the computer body 101, a High-Definition Multimedia Interface (HDMI) connector 18 is provided. The HDMI connector 18 can be connected to a video display device 2 by means of an HDMI cable "A", as shown in FIG. 2. The video display device 2 is a large-screen high-definition television receiver (TV), for example. Various pieces of software (application programs) for playing back high-definition video data are installed in the computer 1. By connecting the computer 1 to the video display device 2 by means of the HDMI cable "A", high-definition video played back by the application programs can be enjoyed on the video display device 2.

Further, the computer 1 and the video display device 2 connected by means of the HDMI cable "A" can transmit various commands for operation control of the connection destination to/from each other via the HDMI cable "A". In the present embodiment, it is assumed that the operation of the computer 1 is controlled based on various commands transmitted from the video display device 2.

In order to perform operation control based on various commands transmitted from the video display device 2, EDID information stored in the video display device 2, more specifically, the physical address included in the EDID information must be acquired. Therefore, in order to perform operation control for transition to a power-on state when the computer 1 is in a power-off state and receives a command requiring the power to be turned on from the video display device 2, a mechanism for enabling acquisition of the EDID information even in a power-off state must be provided. The computer 1 has realized such a mechanism while maintaining power conservation. Details about this will be described below.

First Embodiment

First, the first embodiment of the invention will be described with reference to FIG. 3 and FIG. 4. FIG. 3 and FIG. 4 show system configurations of a computer 1. FIG. 3 also shows a power-on state of the computer 1 and FIG. 4 also shows a power-off state of the computer 1.

According to the first embodiment, the computer 1 includes a CPU 11, a chipset 12, a main memory 13, a graphics controller 14, an embedded controller/keyboard controller (EC/KBC) 15, a power supply controller 16 (PSC), a Consumer Electronics Control (CEC) Controller 17, and so forth, as shown in FIG. 3 and FIG. 4.

The CPU 11 is a processor which controls operations of the members of the computer 1. The chipset 12 is a bridge device for relaying a local bus of the CPU 11 to a Low Pin Count (LPC) bus. The chipset 12 includes a function of executing communications with the graphics controller 14 via the buses, and includes a memory controller for controlling access by the main memory 13.

The main memory 13 is a memory device which is a main memory of the computer 1, and provides a work area which the CPU 11 can directly access. The graphics controller 14 is a device which manages the output side of the user interface provided by the computer 1, and controls an LCD 103. Further, the graphics controller 14 also includes a function of externally outputting video signals from the HDMI connector 17. That is, data transmit to/from the video display device 2 connected via the HDMI cable "A" is basically performed by the graphics controller 14. A TMDS signal line, as shown FIG. 3 and FIG. 4, is a signal line for transmitting video signals and audio signals (i.e., AV signals), and a DDC signal line, as shown FIG. 3 and FIG. 4, is a signal line for transmitting various information items including the above-described EDID information.

An HPD signal line is a signal line for detecting a state of electrical connection with the video display device 2. When the video display device 2 includes a plurality of input systems, for example, only the HPD signals in an HPD signal line of the selected input system is generally set to a value indicating connection establishment. Therefore, by monitoring the HPD signal line, the computer 1 can detect the state of electrical connection with the video display device 2.

The EC/KBC 15 is a one-chip microcomputer in which an embedded controller for power management, a keyboard controller for controlling a keyboard 104, a power button 105 and a touch pad 106 are integrated. That is, the EC/KBC 15 manages power supply control over the members of the computer 1 in cooperation with the PSC 16, and also manages the input side of the user interface supplied by the computer 1. The EC/KBC 15 operates when the computer 1 is turned off, and continuously executes power supply to the CEC controller 17 even when the computer 1 is turned off (In a power-off state, power supply is interrupted in the hatched members shown in FIG. 4).

The CEC controller 17 is a device which executes transmit control of data for inputting/outputting various commands for operation control via an HDMI connector 18. The CEC signal line, as shown FIG. 3 and FIG. 4, is a signal line for transmitting various commands. As described above, power supply to the CEC controller 17 is continuously performed even when the computer 1 is turned off.

That is, the computer 1 of the first embodiment realizes operation control according to an operation instruction from a connection destination even in a power-off state, by mounting the CEC controller 17, to which power supply is continuously performed even in a power-off state. To that end, the CEC controller 17 of the computer 1 can use the DDC signal line and the HPD signal line as well as the CEC signal line. Thereby, even in a power-off state in which power supply to the graphics controller 14 is interrupted, as shown in FIG. 4, it is possible to detect a state of electrical connection with the video display device 2 by means of the HPD signal line, and acquire EDID information (physical address of the video display device 2 included in the EDID information) necessary for operation control based on various commands input by the CEC signal line, by means of the DDC signal line.

When the computer 1 is in a power-off state and an HPD signal in the HPD signal line becomes a value indicating connection establishment, the CEC controller 16 detects this change of states and acquires EDID information of the video display device 2, which is the connection destination. Thereby, preparations for receiving various commands via the CEC signal line are made. When a command requiring the power to be turned on is input from the video display device 2 via the CEC signal line, the CEC controller 16 provides the EC/KBC 15 with an instruction to switch to a power-on state. Upon receipt of the instruction, the EC/KBC 15 requires the PSC 16 of power supply to each member.

When the computer 1 is in a power-on state and an HPD signal on an HPD signal line becomes a value indicating connection establishment, the graphics controller 14 detects this change of states and acquires EDID information of the video display device 2, which is a connection destination. The EDID information is notified of the CEC controller 16 via the LPC bus. Thereby, preparations for receiving various commands via the CEC signal line are made.

The DDC signal line, which is provided to be usable by both of the graphics controller 14 and the CEC controller 17, is not usually equipped with a function of communication arbitration processing with the video display device 2. Therefore, simultaneous communications from both of the graphics controller 14 and the CEC controller 17 are not usually secured. The CEC controller 17 provides a mechanism for prohibiting use of the DDC signal line when the computer 1 is in a power-on state (The broken line of the DDC signal line led to the CEC controller 17 shown in FIG. 3 indicates the prohibition state). As for the HPD signal line, such exclusive control is not necessary, and a state of electrical connection with the video display device 2 can be monitored both from the graphics controller 14 and the CEC controller 17.

Thus, according to the first embodiment, by mounting a CEC controller 17 which prohibits use of the DDC signal line in a power-on state, permits use of the DDC signal only in a power-off state, and continuously performs power supply even in a power-off state, the computer 1 realizes operation control according to an operation instruction from the connection destination even in a power-off state.

Second Embodiment

Next, the second embodiment of the invention will be described with reference to FIG. 5 and FIG. 6. FIG. 5 and FIG. 6 illustrate system configurations of the computer 1 according to the second embodiment. FIG. 5 also shows a power-on state of the computer 1, and FIG. 6 also shows a power-off state of the computer 1.

In the above-described first embodiment, the CEC controller 16 is additionally mounted on the conventional system configuration. In the computer 1 according to the second embodiment, on the other hand, a CEC controller 151 including a function corresponding to that of the CEC controller 16 of the first embodiment is included in the EC/KBC 15.

Since the EC/KBC 15 operates even in a power-off state, the CEC controller 151 included in the EC/KBC 15 also operates in a power-off state, as a matter of course. Further, since the CEC controller 151 includes a mechanism for prohibiting use of the DDC signal line when the computer 1 is in a power-on state, exclusive control from the graphics controller 14 and the CEC controller 17 is realized.

Thus, in the computer 1 of the second embodiment in which the CEC controller 151 is included in the EC/KBC 15, operation control can be performed according to an operation instruction from a connection destination even in a power-off state, as in the case of the above-described computer 1 of the first embodiment.

Third Embodiment

Next, the third embodiment of the invention will be described with reference to FIG. 7 and FIG. 8. FIG. 7 and FIG. 8 show system configurations of the computer 1 (according to the third embodiment). FIG. 7 also shows a power-on state of the computer 1, and FIG. 8 also shows a power-off state of the computer 1.

In the above-described second embodiment, the CEC controller 151 (including a function corresponding to that of the CEC controller 16 of the first embodiment) is included in the EC/KBC 15. In the computer 1 of the third embodiment, on the other hand, a CEC controller 141 including a function corresponding to that of the CEC controller 16 of the above-described first embodiment is included in the graphics controller 14.

More specifically, different power blocks are provided in the graphics controller 14, and a CEC controller 141 is arranged in one of the power blocks. The EC/KBC 15 controls power supply such that power is supplied to the overall graphics controller 14 in a power-on state, and power is supplied only to the CEC controller 141 in the graphics controller 14 in a power-off state.

In the computer 1 of the third embodiment, an advantage that all the signal lines of a TMDS signal line, a DDC signal line, an HPD signal line, and a CEC signal line need to be connected only to the graphics controller 14 can be obtained.

Further, in the computer 1, when a command requiring the power to be turned on is input from the video display device 2 via a CEC signal line in a power-off state in which power is supplied only to the CEC controller 141 in the graphics controller 14, a wakeup signal line via which the CEC controller 141 instructs the EC/KBC 15 to switch to a power-on state is provided between the graphics controller 14 and the EC/KBC 15. This enables the EC/KBC 15 to request the PSC 16 to supply power to each member.

Thus, in the computer 1 according to the third embodiment in which the CEC controller 141 is provided in the graphics controller 14 and the wakeup signal line is provided between the graphics controller 14 and the EC/LBC 15, operation control can be realized according to the operation instruction from the connection destination even in a power-off state, as in the above-described cases of the computer 1 according to the first embodiment and the computer 1 according to the second embodiment.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
   a connector configured to detachably connect a cable comprising a first signal line for transmitting video signals and audio signals, a second signal line for receiving and transmitting various commands for operation control, a third signal line for transmitting identification information of a connection destination for performing operation control based on the various commands, and a fourth signal line for detecting a state of electrical connection with a connection destination
   a graphics controller configured to control output of video signals and audio signals from the first signal line, the graphics controller comprising a first retrieving module configured to retrieve identification information of the connection destination via the third signal line when the state of electrical connection with a connection destination is detected by the fourth signal line;

a management controller configured to receive and to transmit the various commands via the second signal line, the management controller comprising a second retrieving module configured to retrieve identification information of the connection destination via the third signal line when the state of electrical connection with the connection destination is detected by the fourth signal; and a power supply control module configured to supply power to both the graphics controller and the management controller during a power-on state, and to supply power to the management controller in a power-off state, wherein the management controller is configured to deactivate the second retrieving module when the state of electrical connection with the connection destination is detected by the fourth signal line during a power-on state.

2. The information processing apparatus of claim 1, wherein the management controller is further configured to instruct the power supply control module to switch to a power-on state when a command requesting power to be turned on is received via the second signal line during a power-off state.

3. The information processing apparatus of claim 1, wherein the connector is configured to detachably connect a High-Definition Multimedia Interface (HDMI) cable.

4. An information processing apparatus comprising:

a connector configured to detachably connect a cable comprising a first signal line for transmitting video signals and audio signals, a second signal line for receiving and transmitting various commands for operation control, the cable comprising a third signal line for retrieving identification information of a connection destination for performing operation control based on the various commands, and a fourth signal line for detecting a state of electrical connection with a connection destination;

a graphics controller configured to control output of video signals and audio signals from the first signal line, the graphics controller comprising a first retrieving module configured to retrieve identification information of the connection destination via the third signal line when the state of electrical connection with a connection destination is detected by the fourth signal line; and a power supply control module configured to control power supply for members comprising the graphics controller, the power supply control module comprising a management controller configured to receive and to transmit the various commands via the second signal line, the management controller comprising a second retrieving module configured to retrieve identification information of the connection destination via the third signal line when the state of electrical connection with the connection destination is detected by the fourth signal line, wherein the management controller of the power supply control module is configured to deactivate the second retrieving module when the state of electrical connection with the connection destination is detected by the fourth signal line during a power-on state.

5. The information processing apparatus of claim 4, wherein the connector is configured to detachably connect to a High-Definition Multimedia Interface (HDMI) cable.

* * * * *